(12) United States Patent
Bouvier et al.

(10) Patent No.: US 9,416,833 B2
(45) Date of Patent: Aug. 16, 2016

(54) DISC BRAKE FOR A VEHICLE AND METHOD FOR ASSEMBLING THE COMPONENTS THEREOF

(75) Inventors: Veronique Bouvier, Saint Etienne des Oullieres (FR); Romain Epale, Villefranche sur Saone (FR); Etienne Bocard, Saint Jean d'Ardieres (FR); Richard Visee, Oullins (FR)

(73) Assignee: Saint Jean Industries, Saint Jean D'ardiers (FR)

( * ) Notice: Subject to any disclaimer, the term of this patent is extended or adjusted under 35 U.S.C. 154(b) by 0 days.

(21) Appl. No.: 14/234,660

(22) PCT Filed: Jul. 20, 2012

(86) PCT No.: PCT/FR2012/051724
§ 371 (c)(1),
(2), (4) Date: Jan. 24, 2014

(87) PCT Pub. No.: WO2013/014375
PCT Pub. Date: Jan. 31, 2013

(65) Prior Publication Data
US 2014/0174864 A1    Jun. 26, 2014

(30) Foreign Application Priority Data
Jul. 26, 2011 (FR) ...................................... 11 56791

(51) Int. Cl.
*F16D 65/12* (2006.01)
*F16D 65/02* (2006.01)

(52) U.S. Cl.
CPC .............. *F16D 65/123* (2013.01); *F16D 65/12* (2013.01); *F16D 2065/136* (2013.01); *F16D 2250/0084* (2013.01); *F16D 2250/0092* (2013.01); *Y10T 29/49826* (2015.01)

(58) Field of Classification Search
CPC .. F16D 65/123; F16D 65/12; F16D 2065/136
See application file for complete search history.

(56) References Cited

U.S. PATENT DOCUMENTS 2,558,297 A * 6/1951 Horn ......................... 188/218 R
3,661,235 A * 5/1972 Harrison ............... F16D 65/123
188/218 XL (Continued)

FOREIGN PATENT DOCUMENTS

DE 10 2008 03575  2/2010
EP      1 900 962   3/2008

(Continued)

OTHER PUBLICATIONS

International Search Report from parent PCT application PCT/FR2012/051724, 4 pages.

(Continued)

*Primary Examiner* — Bradley King
(74) *Attorney, Agent, or Firm* — Tech Valley Patent, LLC; John Pietrangelo

(57) ABSTRACT

Disc brake incorporating an assembly of a crown (11) and a brake bowl (12), with the brake bowl (12) incorporating a circular base (12a), extended radially and externally by lugs (12b), with the crown accommodating a number of fingers (13) protruding externally into the interior volume of the crown (11). The lugs (12b) have a staged configuration with, at the end, a hood form (12d) internally establishing a housing for each of the fingers (13); the lugs have an access opening in unclosed 'U' form; the lugs (12b) are oriented in the same direction, with their opening part on the same side. After assembly of the brake bowl and the crown, the lugs are closed around the fingers, by distortion and flowage of the material around the finger, leaving them a capability for axial movement.

11 Claims, 8 Drawing Sheets

(56) References Cited

U.S. PATENT DOCUMENTS

| | | | |
|---|---|---|---|
| 5,810,123 A * | 9/1998 | Giorgetti | F16D 65/123 188/218 XL |
| 5,988,324 A * | 11/1999 | Bertetti | B60B 27/0005 188/18 A |
| 6,033,032 A | 3/2000 | Rutter | |
| 6,035,978 A * | 3/2000 | Metzen et al. | 188/218 XL |
| 6,821,022 B2 * | 11/2004 | Brunetti et al. | 384/544 |
| 2010/0065388 A1 * | 3/2010 | Kleber | B22D 19/04 188/218 XL |
| 2010/0084231 A1 | 4/2010 | Biondo et al. | |
| 2010/0230221 A1 | 9/2010 | Biondo et al. | |
| 2011/0079474 A1 * | 4/2011 | Fujita | F16D 65/12 188/218 XL |
| 2013/0037359 A1 * | 2/2013 | Kim | F16D 65/12 188/218 XL |

FOREIGN PATENT DOCUMENTS

| | | |
|---|---|---|
| EP | 2025965 A1 | 2/2009 |
| EP | 2 249 055 | 11/2010 |
| FR | 2931219 A1 | 11/2009 |

OTHER PUBLICATIONS

Written Opinion from parent PCT application PCT/FR2012/051724, 7 pages.

* cited by examiner

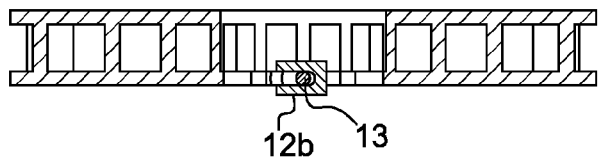
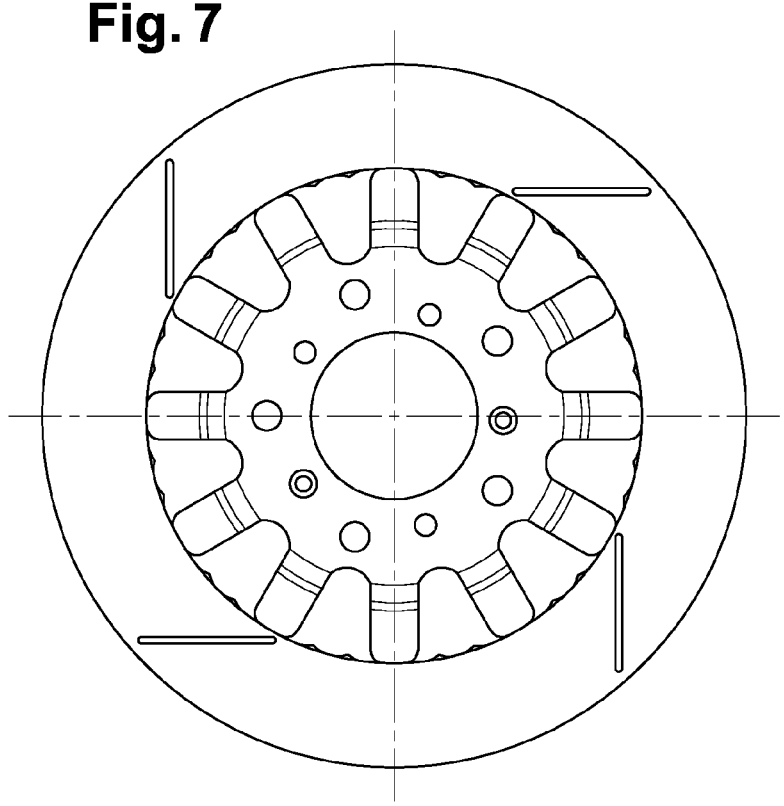
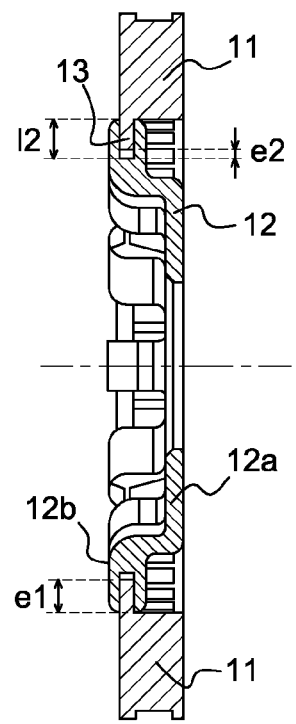
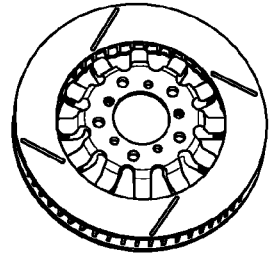

Fig. 12
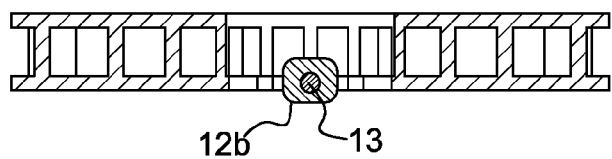
Fig. 11
Fig. 13
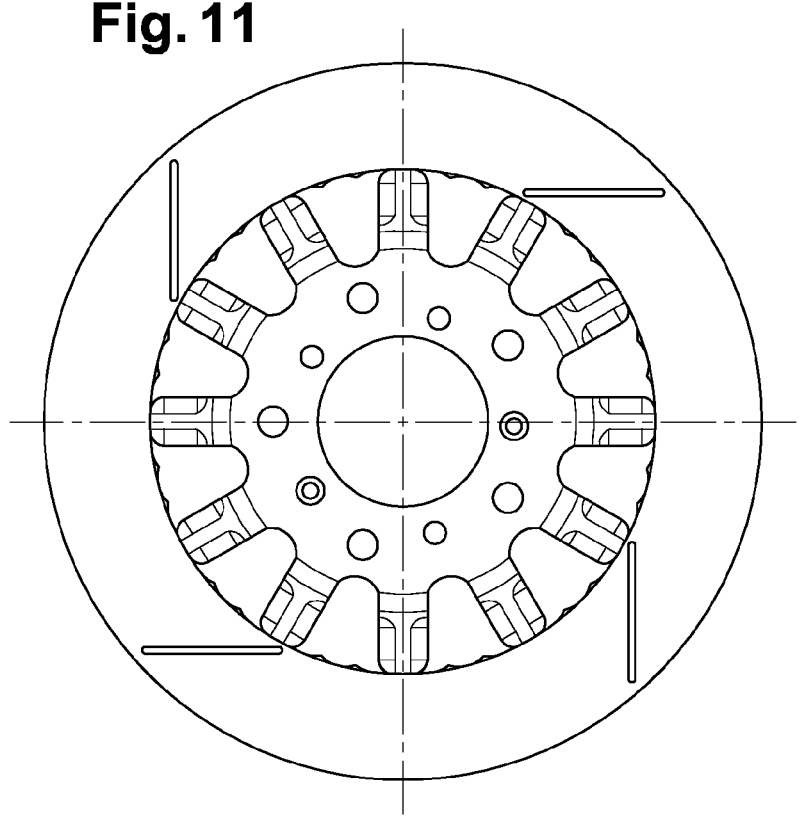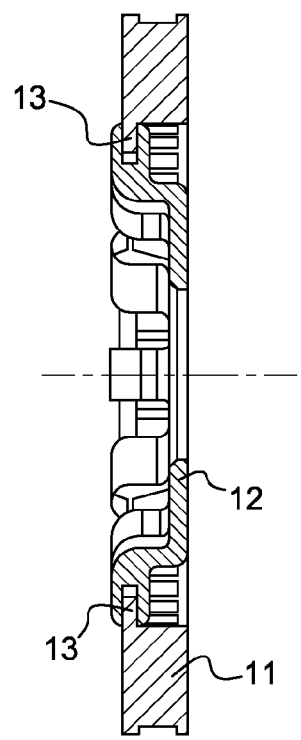
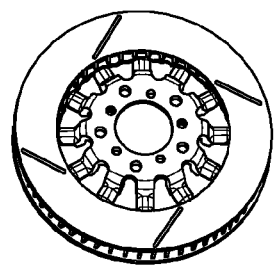
Fig. 14

DISC BRAKE FOR A VEHICLE AND METHOD FOR ASSEMBLING THE COMPONENTS THEREOF

CROSS-REFERENCE TO RELATED APPLICATIONS

This application is a §371 filing of PCT application PCT/FR2012/051724 filed on Jul. 20, 2012, which claims priority from French application FR 1156791 filed on Jul. 26, 2011. The disclosures of these applications are included by reference herein in their entirety.

BACKGROUND

Field of the Invention

The invention pertains to the technical field of disc brakes for vehicles, particularly for cars.

DESCRIPTION OF RELATED ART

Commonly, disc brakes incorporate two principal components, namely a crown (1) and a brake bowl (2), which are assembled together by means of screw-type tightening systems. FIG. 1 shows past art for a brake disc assembled in a known configuration, while FIG. 2 shows the brake bowl (2) that is assembled between the flanges (1a-1b) of the crown (1). This brake bowl (2) has a number of lugs (2a) that are all designed with an oblong hole to allow passage for the tightening screw (3). This assembly allows the radial expansion of the crown when it heats, and allows the brake to rise in temperature in a normal vehicle rolling situation. However, this system has constraints, with a limitation of the expansion play. There are also disc brakes manufactured in one single piece.

Other technical systems have been proposed, such as described in patents DE 10 2008 035750, EP 1 900 962, EP 2 249 055, WO 2008/135876, and WO 2008/136032.

The Applicant wanted to distinguish itself from the technologies described in these documents, and improve the control over the relative expansion between the bowl and the crown caused by heating during working situations of the vehicle.

Moreover, in patent FR 2 931 219, there is a disc brake rotor composed of:
- a securing ring including a central axis of symmetry in rotation and an interior cylindrical wall on which there is one, or more, protrusions oriented towards the central axis separating successive radial slots in alternation;
- a bowl incorporating an exterior cylindrical wall with lugs bounding, between them, an axial slot in the exterior cylindrical wall, with each of the said lugs being designed to enter the successive radial slots while applying itself against the said protrusion so as to enable it to slide radially in the axial slot. More specifically, the said lugs have ends folded so as to apply themselves against the protrusion in question.

This special arrangement requires the production of lugs such as illustrated in the drawings of the above-stated patent, with hook shapes or special staples and folded ends, thus endowing a very great fragility and risks of breakage. The manufacturing is complex, and requires various folding operations. The ends of the said folded lugs remain fragile due to the connecting hinge effect with the lugs themselves. The bearing of the said lug ends remains highly variable on the protrusion and, therefore, the hold of the protrusion remains very uncertain. While the principle of the system described enables the formed protrusions to be guided in each of the chambers composed, the robustness of the overall assembly remains subject to caution as regards the expansion constraints and stresses.

BRIEF SUMMARY OF ASPECTS OF THE INVENTION

The Applicant's approach, therefore, has been to redesign the concept of the disc brake by providing a solution to the problem of the relative expansion between the bowl and the crown.

Another aim sought in the invention was to properly control the position of the bowl in relation to the crown during the braking operation.

The solution implemented by the Applicant caters to these aims with a very-specific assembly technology between the brake bowl and the crown; this technology provides the specified advantages.

According to a first characteristic, the vehicle disc brake, of a type incorporating an assembly of a crown and a brake bowl, with the said crown consisting of at least one circular flange, with the said flange(s) establishing an interior space for the insertion of the brake bowl; the said brake bowl incorporates a circular base is extended radially and externally by lugs; the crown accommodates a number of fingers protruding externally into the interior volume of the crown; the lugs are designed to allow the accommodation of the said fingers, their axial guidance, and their holding, to allow the taking-up of the expansion of the crown and fingers by axial movement of the said fingers during the vehicle's operation. The said lugs have a staged configuration with, at the end, a hood form internally establishing a housing for each of the fingers of the said crown; the lugs, of which the number will be the same as the number of fingers, have—before assembly of the brake bowl with the crown—at least one access opening in an unclosed 'U' shape. The said lugs are oriented in the same direction with their opening part on the same side. The travel limitation areas constituted by the bottom parts of each initial 'U' shape of the lugs are oriented to maximize the holding of the connection as a function of the braking stresses. The lugs have a staged configuration with, at the end, a hood form establishing two branches parallel with each other, with a space between them. Thus, these lugs have a 'U' shape closed on one side by the bottom and open at the other end; the said lugs are open at their front end. After assembly of the brake bowl and the crown, the said lugs are closed around the said fingers, by distortion and flowage of the material around the said finger, while leaving them a capability for axial movement.

According to another characteristic, the process of assembly of a vehicle disc brake, of a type incorporating a crown and a brake bowl, is remarkable in that it consists in manufacturing, firstly, a disc brake crown, with the said crown incorporating a number of radially-positioned fingers protruding internally into the volume of the crown, and, secondly, a brake bowl designed with a number of lugs—the said number equaling the number of fingers—with the said lugs being arranged in a staged configuration with, at the end, a hood shape with an access opening in 'U' form constituting a housing to allow the insertion of the fingers, by movement of the crown and the brake bowl in relation to each other; the assembly of the brake bowl and the crown is accomplished via an operation of distortion of the said lugs, with a resulting flowage of the material to surround the said fingers in the interior housings, while allowing their radial movement during the expansion of the brake bowl.

According to another characteristic of the invention, the assembly of the brake bowl with the crown is accomplished by crimping/pressing.

These characteristics and others besides will be clearly understood by further reading of the description below.

BRIEF DESCRIPTION OF THE DRAWINGS

To clarify the purpose of the invention, non-limitative illustrations are provided, in which:

FIG. 7 is a top view showing the removable brake disc, with its components but before the crimping operation;

FIG. 8 is a cross-section, in accordance with the line B-B of FIG. 7;

FIG. 9 is an axial cross-section, in accordance with the line A-A of FIG. 7;

FIG. 10 is an in-perspective view of the disc brake illustrated in FIGS. 7, 8 and 9 before the crimping operation;

FIG. 11 is a top view showing the removable brake disc assembled with its components after the crimping operation;

FIG. 12 is a cross-section, in accordance with the line C-C of FIG. 11;

FIG. 13 is an axial cross-section, in accordance with the line D-D of FIG. 11;

FIG. 14 is an in-perspective view of the disc brake illustrated in FIGS. 11, 12 and 13 after the crimping operation;

DETAILED DESCRIPTION OF ASPECTS OF THE INVENTION

Figure 1:
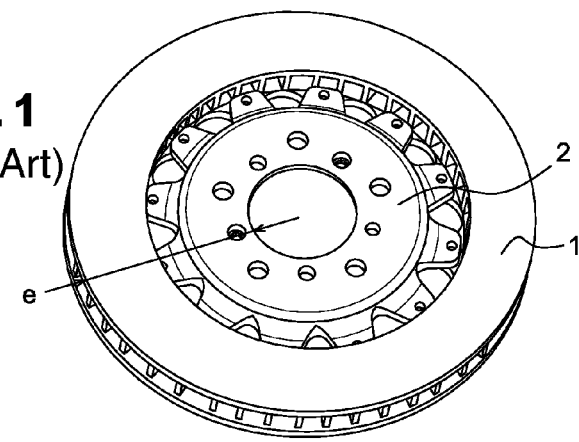
FIG. 1 is a three-quarter view in perspective illustrating the assembly of a brake disc according to past art, composed of a crown and a brake bowl.
Figure 2:
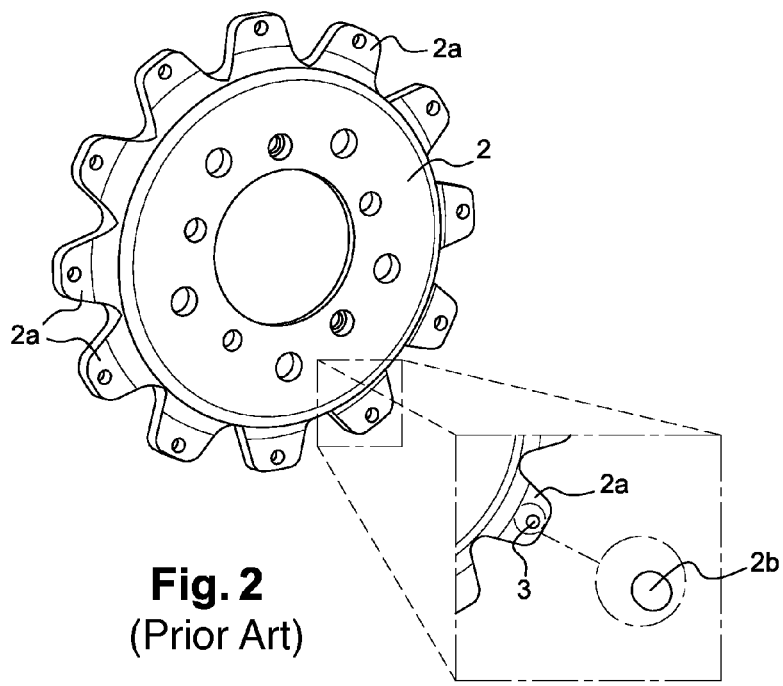
FIG. 2 is a view providing an in-perspective illustration, derived from FIG. 1, of the brake bowl alone with, in exploded illustration, the connecting and securing lug.

In order to better clarify the purpose of the invention, it will now be described in a non-limitative manner, illustrated by the Figures.

The disc brake implemented in accordance with the assembly process according to the invention is referenced overall by (10). It incorporates a crown (11) and its brake bowl (12).

According to the invention, the crown (11) is composed of at least one or of two circular flanges (11a-11b) spaced apart by connecting plates (11c) positioned radially at regular distances or intervals. The connection of the said flanges is accomplished by any appropriate means. The insertion area for the brake bowl is provided within the space (e) formed by the flanges.

According to the specific nature of the said crown, it incorporates a number of fingers (13) positioned radially at regular intervals, protruding into the said central space (e) accommodating the brake bowl. These fingers protrude externally into the interior volume of the crown. They are positioned and fixed via any appropriate manner,—via welding or another process—onto certain connecting plates (11c) and, more generally, on the framework of the crown; for example, on one of the flanges such as illustrated in FIGS. 8, 9, 12, 13, and 16.

The brake bowl (12) incorporates, in a known manner, a circular base (12a) extended radially and externally by lugs (12b).

Figure 3:
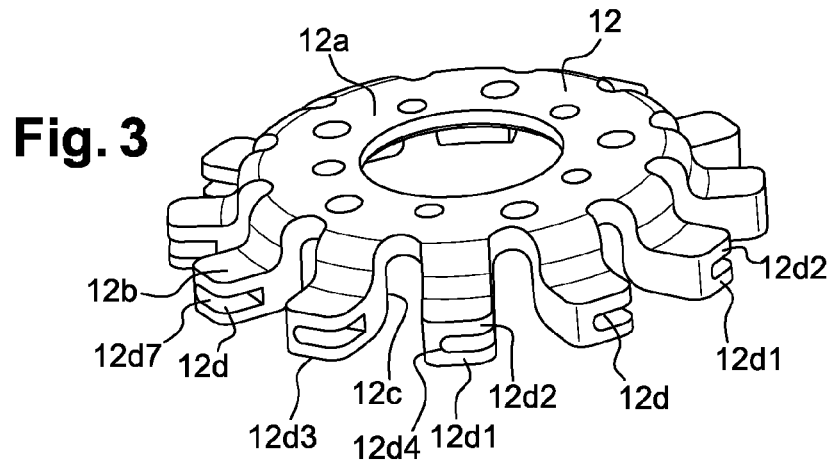
FIG. 3 is an in-perspective view of the brake bowl alone, in accordance with a first implementation within the scope of this invention herein.
Figure 4:
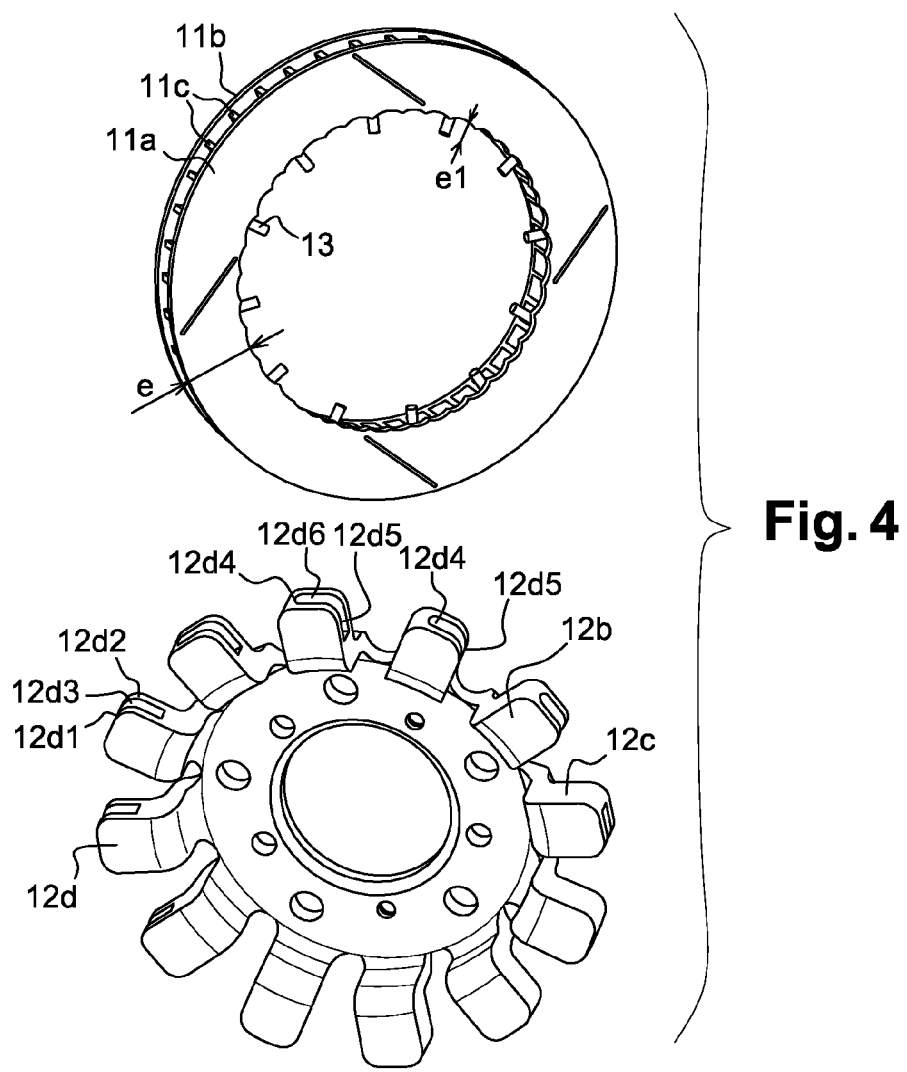
FIG. 4 is an in-perspective view before assembly of the disc in its configuration according to the invention, with the brake bowl and the crown.
Figure 5:
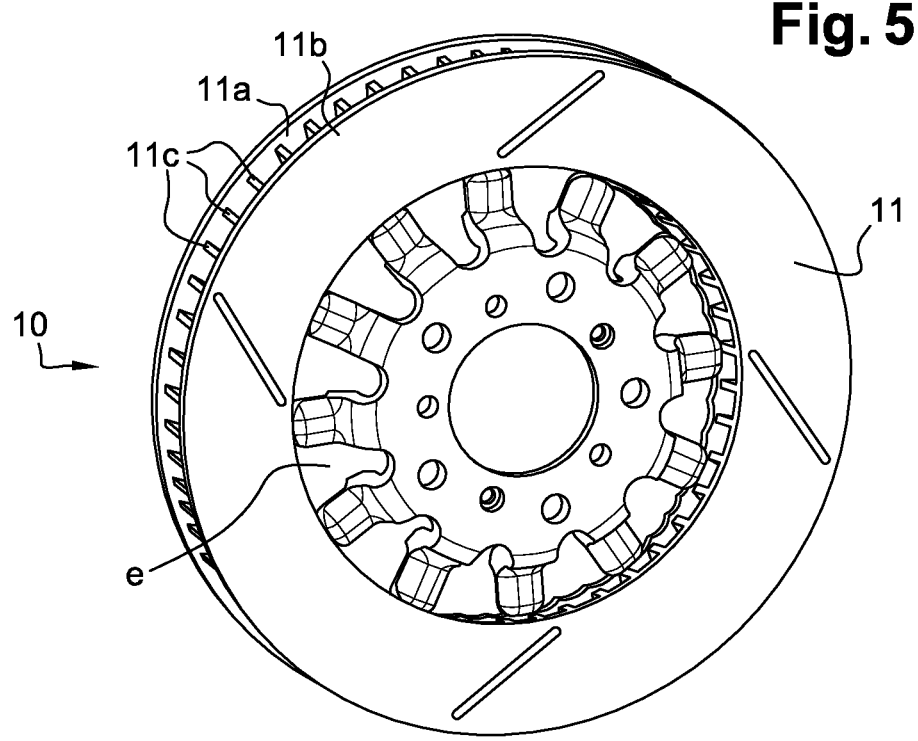
FIG. 5 is a view of the disc brake according to the invention, after assembly of the brake bowl and the crown, subsequent to a crimping operation.
Figure 6:
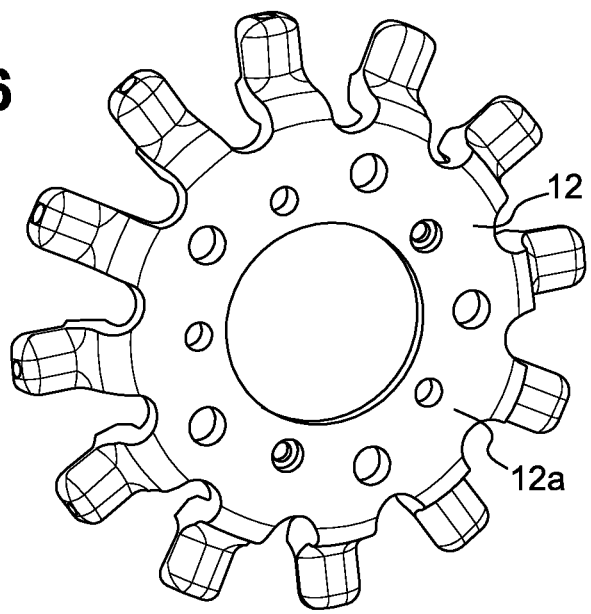
FIG. 6 is an in-perspective view of the brake bowl alone, after crimping, with the brake bowl being illustrated alone for comprehension of the invention.
Figure 15:
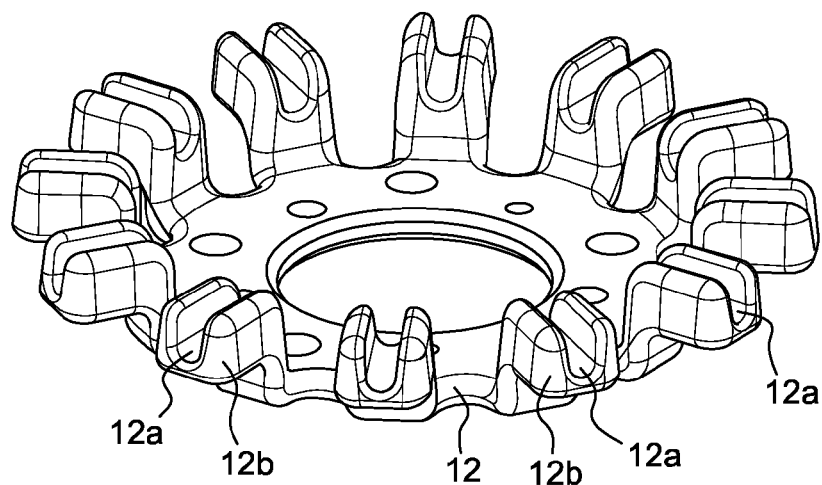
FIG. 15 is an in-perspective view of the brake bowl alone, in accordance with a second implementation within the scope of the invention.
Figure 16:
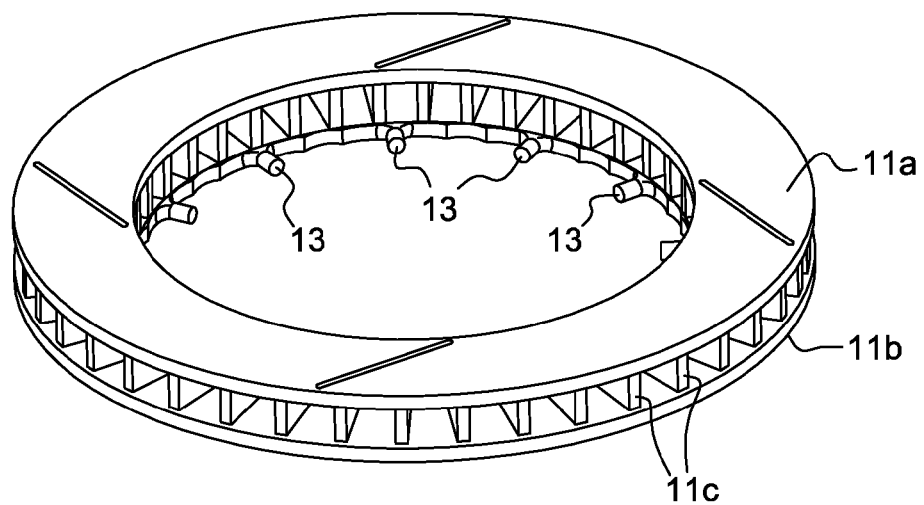
FIG. 16 is a view in perspective of the crown capable of accommodating the brake bowl in accordance with FIG. 15.

According to the invention, the lugs (12b) have a staged configuration (12c) with, at the end, a hood form (12d) establishing two branches (12d1) (12d2) parallel with each other, with a space (12d3) between them. Thus, these lugs (12b) have a 'U' form closed on one side by the bottom (12d4) and open at the other end (12d5). In addition, the said lugs (12b) are open at their front end (12d6). Thus, as illustrated in FIG. 3, the said lugs (12b) are all oriented in the same direction, with their opening parts on the same side. Thus, according to the invention, the said lugs are designed to provide, within their thickness, an accommodating area (12d7) housing the fingers (13) positioned on the crown.

Two implementations illustrated in FIGS. 3 to 14 and 15 to 18 show the orientation of the said lugs and, more specifically, the positioning of the opening area (12d). In FIGS. 3 to 14, the openings are oriented radially within the lateral thickness of the brake bowl. In FIGS. 15 to 18, the openings are oriented towards the front of the brake bowl.

The number of lugs (12b) and fingers (13) is established to allow a centering of the brake bowl (12) within the space (e) of the crown (11); the fingers (13) are positioned opposite the accommodating housings (12d7) provided in each of the lugs (12b).

In the case of the implementation in FIGS. 3 to 14, the movement of the brake bowl in relation to the crown is achieved by introducing the said bowl into the interior cavity within the crown, and then performing an angular rotation of the brake bowl (12) by a few degrees in relation to the crown, or vice versa, allowing centering of the said fingers (13) at the bottom of the housings provided in each of the lugs (12b).

Figure 17:
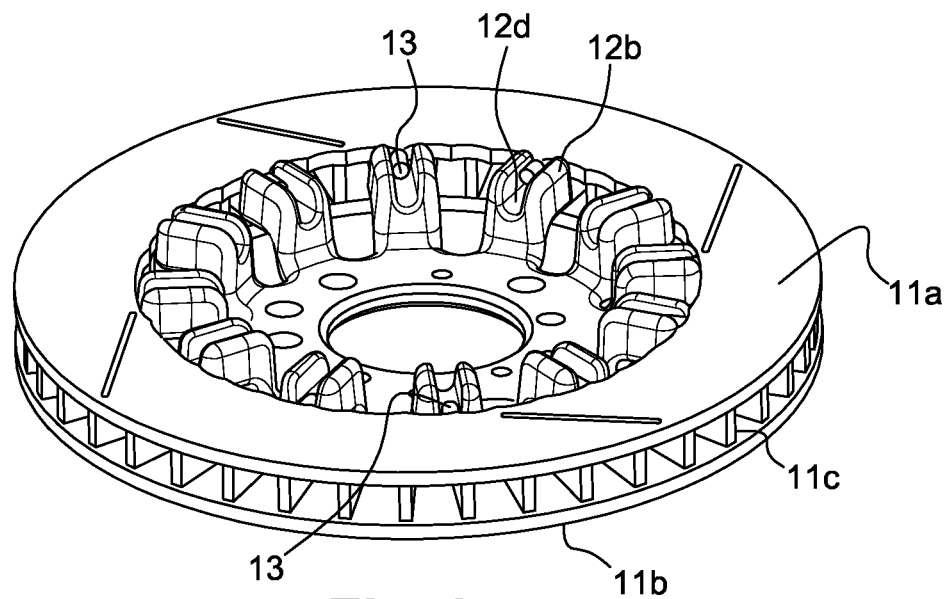
FIGS. 17 and 18 illustrate the positioning of the brake bowl and the crown, in accordance with the second implementation, before and after crimping.
Figure 18:
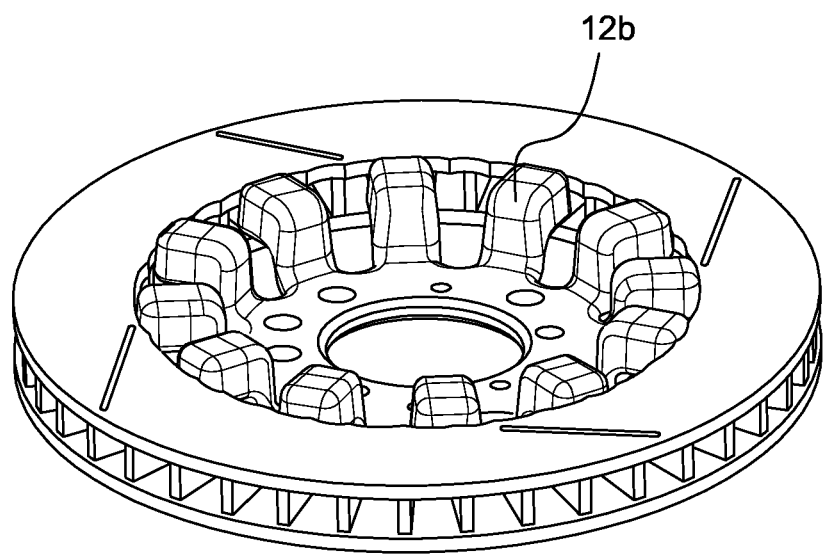

According to the second implementation, in FIGS. 15 to 18, the movement of the brake bowl within the crown is accomplished by positioning the fingers (13) within the bottom of the hood forms of the said lugs, as is illustrated notably in FIG. 17.

The connection of the brake bowl (12) in relation to the crown (11) is accomplished via a distortion and shaping operation performed on each of the lugs (12b), so that they provide a laterally-closed housing accommodating a finger, open at the front to allow the taking-up of the expansion of the crown and the fingers during the vehicle's operation. This implementation is automated for all the lugs (12b) of the brake bowl with the crown. Preferably, this operation will be performed by crimping and pressing. It causes a phase of flowage of the constituent material of the lugs around the fingers (13), in order to close the lateral opening which exclusively allows the insertion of the fingers (13) into their housing. The phase of flowage of the material enables each finger to be surrounded without strong compression stress around the finger, which allows the fingers to be released during expansion of the material when it is hot, and facilitates the expansion of the crown. The geometry of each housing is designed to take-up the expansion of the fingers (13).

Figure 19:
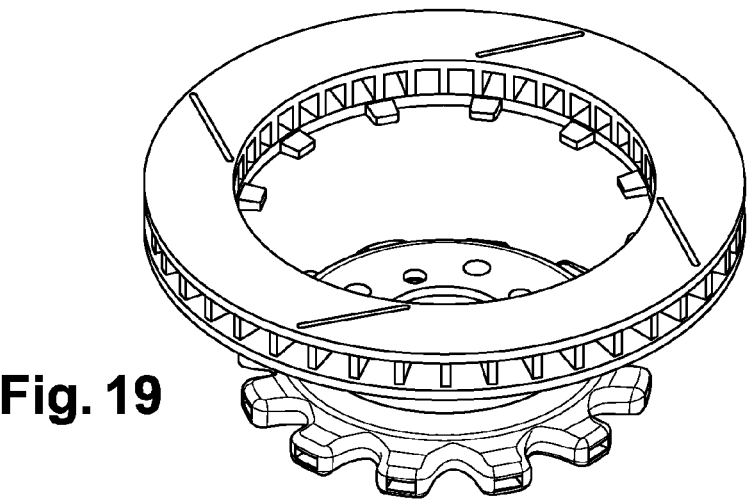
FIG. 19 illustrates a third variant in the profile of the lugs formed on the brake bowl and the fingers formed on the crown, in a trapezoidal configuration. In this Figure, the brake bowl is illustrated with its lugs closed.
Figure 20:
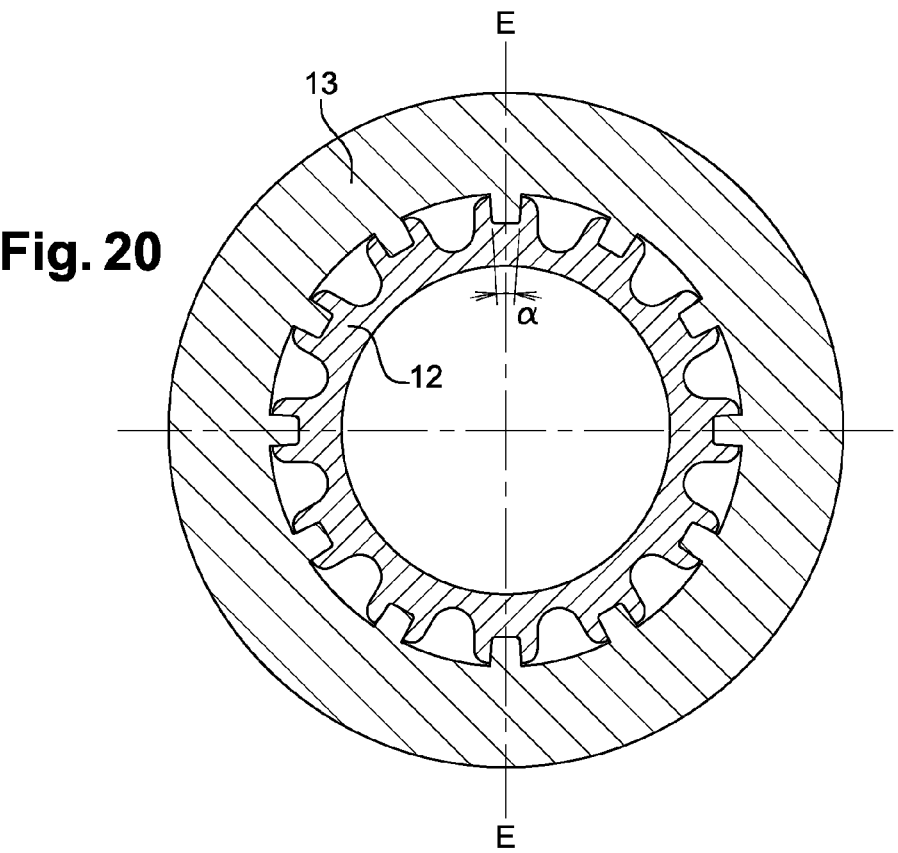
FIG. 20 is a schematic cross-section illustrating the assembly of the brake bowl onto the crown, in the configuration of lugs and fingers according to FIG. 19.
Figure 21:
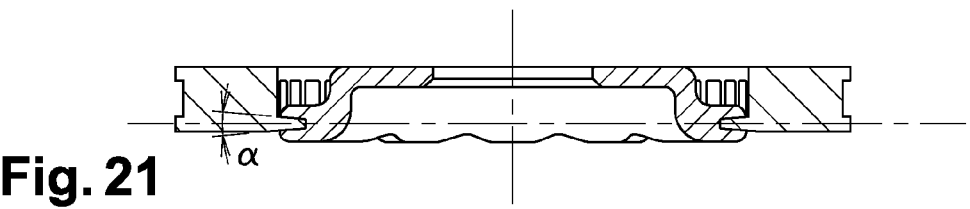
FIG. 21 is a cross-section, in accordance with the line E-E of FIG. 20.

FIGS. 19, 20 and 21 illustrate another possible implementation in the configuration of the lugs (12) and the fingers (13). The fingers (13) thus have a trapezoidal configuration (13b) with conical parts, while the configuration of the lugs (12) is also profiled in a complementary manner, with a trapezoidal cross-section. This thus establishes a relief angle α that facilitates the assembly. Note that the opening provided in the lugs, allowing the insertion of the fingers, can be implemented laterally, such as is the case in FIGS. 3 to 14, or at the front, such as is the case in FIGS. 15 to 18.

Thus the invention concerns a process for the designing of a disc brake with two components—a crown and a brake bowl—that are specifically designed to allow their assembly, followed by their connection after an operation of distortion of the lugs, notably by crimping/pressing.

The invention concerns a process consisting of manufacturing, firstly, a disc brake crown, with the said crown incorporating a number of radially-positioned fingers (13) protruding internally into the volume of the crown, and, secondly, a brake bowl designed with a number of lugs—the said number equaling the number of fingers—with the said lugs being positioned in a staged configuration with, at the end, a hood shape in 'U' form, closed at one end by the bottom and open at the other end, to allow the insertion of the fingers, by angular movement of the crown and the brake bowl in relation to each other; the assembly of the brake bowl and the crown is accomplished via a crimping/pressing operation causing the flowage of the material to surround the said fingers in the interior housings while allowing their radial movement during the expansion of the brake bowl.

In other words, the brake bowl is mounted on the crown, in a floating configuration allowing absorption of the effects of extension through expansion due to heating of the disc brake.

According to another important feature of the invention, the travel limitation areas constituted by the bottom part of each initial 'U' form of the lugs are oriented in the direction of braking of the vehicle, so as to maximize the holding of the connection as a function of the braking stresses, with the fingers (13) entering the said bottom part. One thus obtains a better mechanical strength of the disc brake, that eliminates breakage or failure risks.

The advantages of the invention come clearly to the fore; emphasis is placed on the new concept of production and assembly of the disc brake's component parts, its ability to absorb the effects resulting from expansion due to heating and the orientation of the fingers within the most-compact housing part.

The radial expansion of the crown is allowed by the movement of the fingers within the housings provided on the brake bowl, and by the flexibility of the lugs.

The invention claimed is:

1. Vehicle disc brake having a crown and a brake bowl, the crown comprising at least one circular flange defining an internal space for the insertion of the brake bowl, the brake bowl comprising a circular base and lugs extending radially and externally from the circular base, wherein the crown comprises two spaced opposing radial surfaces and a number of fingers protruding between the two spaced opposing surfaces into the internal space of the crown, wherein each of the lugs of the brake bowl are adapted to accommodate one of the number of fingers and radially guide the one of the number of fingers and accommodate expansion of the crown and the number of fingers during operation of the vehicle, wherein each of the lugs comprises a distal hood form which includes a bottom and two parallel branches defining a U-shaped internal space with at least one access opening opposite the bottom adapted to receive one of the number of fingers of the crown, wherein the number of lugs is equal to the number of fingers, wherein the at least one access opening of each of the lugs is oriented in a same direction, wherein the U-shaped internal space of the distal hood form of each of the lugs includes a radially directed travel limitation area oriented to maximize strength of each of the lugs as a function of braking stresses, and wherein, after assembly of the brake bowl and the crown, wherein each of the lugs of the brake bowl have received one of the fingers of the crown, the at least one access opening of each of the lugs is distorted to limit circumferential movement of the fingers within the internal space while permitting radial movement.

2. Disc brake according to claim 1, wherein the at least one access opening is oriented radially within a lateral thickness of the brake bowl.

3. Disc brake according to claim 1, wherein the at least one access opening is oriented towards a front of the brake bowl.

4. Disc brake according to claim 1 wherein the fingers have a trapezoidal configuration, and wherein the internal space of each of the lugs comprises a complementary trapezoidal configuration.

5. Disc brake according to claim 4, wherein the complementary trapezoidal configuration comprises a relief angle α.

6. Process of assembly of a vehicle disc brake in accordance with claim 1, wherein the method comprises:

providing the brake crown, providing the brake bowl, engaging the number of fingers of the crown with the internal space of each of the lugs of the brake bowl, and distorting the at least one access opening of each of the lugs to limit circumferential movement of the fingers within the internal space while permitting radial movement.

7. Process according to claim 6, wherein engaging the number of fingers of the crown with the internal space of each of the lugs of the brake bowl further comprises positioning the brake bowl within the interior space of the crown wherein each of the lugs of the brake bowl is opposite one of the number of fingers of the crown; and angularly rotating the brake bowl in relation to the crown wherein one of the number of fingers of the crown is inserted into the internal space of each of the lugs of the brake bowl.

8. Process according to claim 6, wherein the method further comprises positioning the brake bowl within the interior space in the crown wherein each of the lugs of the brake bowl is opposite one of the number of fingers of the crown.

9. Process according to claim 6, wherein distorting comprises one of crimping and pressing the lugs wherein the at least one access opening is distorted.

10. Process according to claim 6, wherein distortion comprises causing the flowage of material of the lugs to surround each of the number of fingers of the crown.

11. Process according to claim 7, wherein angularly rotating comprises angularly rotating a few degrees.

* * * * *